United States Patent
Renken et al.

(10) Patent No.: US 6,234,426 B1
(45) Date of Patent: May 22, 2001

(54) MODULAR SPACECRAFT CONSTRUCTION REQUIRING NO TOOLS FOR ASSEMBLY AND DISASSEMBLY

(75) Inventors: Raymond H. Renken, Rolling Hills Estates; Joseph F. Anderson, Rancho Palos Verdes, both of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/204,775

(22) Filed: Dec. 3, 1998

(51) Int. Cl.⁷ ................................................... B64G 1/10
(52) U.S. Cl. ........................................ 244/158 R; 292/113
(58) Field of Search ......................... 244/158 R, 158 A; 292/113, 66, 97, 247; 285/92, 87, 88; 411/7, 105, 108, 109

(56) References Cited

U.S. PATENT DOCUMENTS

| | | | |
|---|---|---|---|
| 2,051,899 | * 8/1936 | Rose | 285/92 |
| 2,433,138 | * 12/1947 | Marcell | 285/92 |
| 2,496,087 | * 1/1950 | Fleming | 244/124 |
| 2,737,222 | * 3/1956 | Becker | 411/7 |
| 3,294,140 | * 12/1966 | Cosenza | 411/105 |
| 3,404,716 | * 10/1968 | Cosenza | 411/105 |
| 4,183,564 | * 1/1980 | Poe | 292/113 |
| 4,191,236 | 3/1980 | Duran | 151/69 |
| 4,220,364 | * 9/1980 | Poe | 292/113 |
| 4,609,314 | * 9/1986 | Metz | 411/7 |
| 4,616,967 | * 10/1986 | Molina | 411/105 |
| 4,692,075 | * 9/1987 | Metz | 411/7 |
| 4,822,227 | * 4/1989 | Duran | 411/105 |
| 5,152,559 | * 10/1992 | Henrichs | 292/113 |
| 5,399,053 | * 3/1995 | Duran | 411/105 |
| 5,620,212 | * 4/1997 | Bourne et al. | 292/113 |
| 5,897,080 | * 4/1999 | Barrett | 244/158 A |
| 5,904,317 | * 5/1999 | Elliott et al. | 244/158 R |
| 5,961,076 | * 10/1999 | Eller et al. | 244/158 R |
| 5,979,833 | * 11/1999 | Eller et al. | 244/158 R |
| 5,984,382 | * 11/1999 | Bourne et al. | 292/113 |

\* cited by examiner

*Primary Examiner*—Robert P. Swiatek
(74) *Attorney, Agent, or Firm*—Michael S. Yatsko

(57) ABSTRACT

A modular spacecraft construction having a simple spacecraft core structure (10) of cylindrical shape, spacecraft equipment modules (12) in the form of generally flat panels that are attached in a radial configuration about the core structure, and electronic sub-modules (16) secured to the faces of the spacecraft equipment modules. Hand-operated fasteners (14, 18) facilitate assembly of the modules (12) to the core structure (10) and of the electronic sub-modules (16) to the modules. Each spacecraft equipment module (12) is secured to the core structure (10) using multiple hook-type latches (14) that are hand-operated to secure the module to the core structure. Each sub-module (16) is secured to an equipment module (12) by fasteners (18) of a different type that are also hand-operated. These fasteners (18) have a one-way ratchet a mechanism that prevents their deliberate or inadvertent loosening.

3 Claims, 2 Drawing Sheets

MODULAR SPACECRAFT CONSTRUCTION REQUIRING NO TOOLS FOR ASSEMBLY AND DISASSEMBLY

BACKGROUND OF THE INVENTION

This invention relates generally to modular spacecraft configurations and, more particularly, to modular spacecraft electronic equipment panels that can be externally mounted on a core spacecraft structure.

Conventional spacecraft designs have placed electronic equipment units on panels located inside box-like equipment compartments, with the panels typically forming the walls of the compartments. The equipment compartments are an integral part of the spacecraft structure. Complex interconnecting wiring connects the different electronic units together. Heat dissipated from the electronics equipment is conducted into the compartment panels and radiates into space. The size of each compartment is determined in part by the heat radiating area needed to cool the equipment, so there is often unused volume within each compartment. Because only one side of the equipment panel is used as a radiator, the equipment compartments often have to be very large to maintain desired operating temperatures. A related problem is that accessing equipment requires the removal of panels from the equipment compartment. Not only are compartments of this type bulky to accommodate in a launch vehicle and difficult to access for servicing, but they typically need to be coupled to other thermal radiator panels, through heat-conducting pipes, to provide overall thermal management of the spacecraft.

Further, because the equipment compartments are integral with the core structure of the spacecraft, thermally induced stresses are a significant problem because of temperature differences between the modules and the spacecraft core structure. In brief, these conventional equipment compartments are structurally and thermally dependent on the spacecraft core structure, and the overall design of the spacecraft must take into account the thermal requirements of each module and the structural forces resulting from the presence of each module.

As a result of these difficulties, the spacecraft core structure is usually constructed to have a relatively high weight and volume, to support the modules and to provide an adequate thermal radiation area. Also, it is usually the case that the choice of materials of both the modules and the spacecraft core structure is limited because there is a concern for differential thermal expansion. A further difficulty is that removal or addition of an electronics equipment unit upsets the overall structural and thermal design to some degree. Alignment problems, thermal management problems, or both, can result from simply removing or adding a unit All of the foregoing problems are attributable to interdependence of the equipment modules and the spacecraft core structure, which together interact, both structurally and thermally, as parts of a larger assembly. It will be appreciated, therefore, that there is a need for a different approach to the construction of spacecraft modules for supporting electronic equipment, to overcome the difficulties noted above. U.S. Pat. Ser. 5,897,080 filed DEC. 20, 1996, entitled "Externally Mountable Spacecraft Equipment Module," and assigned to the same assignee as the present application, discloses a spacecraft architecture in which modules in the form of base panels to which electronic components are attached, are designed to be structurally and thermally independent of a spacecraft core structure to which the modules are attached. The prior application is hereby incorporated by reference into the present application, which discloses and claims improved techniques for assembly and disassembly of modules of the type disclosed in the prior application.

SUMMARY OF THE INVENTION

The present invention resides in a modular spacecraft construction in which modules may be conveniently assembled and disassembled without the need for tools. Briefly, and in general terms, the modular spacecraft construction of the invention comprises a spacecraft core structure; at least one spacecraft equipment module in the form of a generally flat panel; at least one electronic sub-module for installation on the equipment module; a plurality of hand-operated fasteners of a first type for attaching the spacecraft equipment module to the spacecraft core structure; and a plurality of hand-operated fasteners of a second type for attaching the electronic module to the spacecraft equipment module. The hand-operated fasteners of the first and second types hold each module and submodule securely, but allow for convenient assembly and disassembly without the need for tools.

More specifically, each fastener of the first type includes a hook-type latch with a hand-operated locking device. To secure the spacecraft panel module there are at least two fasteners of the first type located on each face of the spacecraft equipment module. In the disclosed embodiment of the invention, each fastener of the second type includes a screw-type fastener having a threaded stud that extends through the electronic module to be attached to the module panel, a threaded receptacle installed in the module panel to receive the threaded stud, a one-way ratchet mechanism that prevents deliberate or inadvertent unscrewing rotation of the threaded stud, and a ratchet release mechanism to permit removal of the threaded stud.

It will be appreciated from the foregoing that the present invention represents a significant advance in the field of modular spacecraft construction. In particular, the invention allows spacecraft modules and sub-modules to be quickly assembled and disassembled without the use of tools. Other aspects and advantages of the invention will become apparent from the following more detailed description, taken in conjunction with the accompanying drawings.

DESCRIPTION OF THE PREFERRED EMBODIMENT

Figure 1:
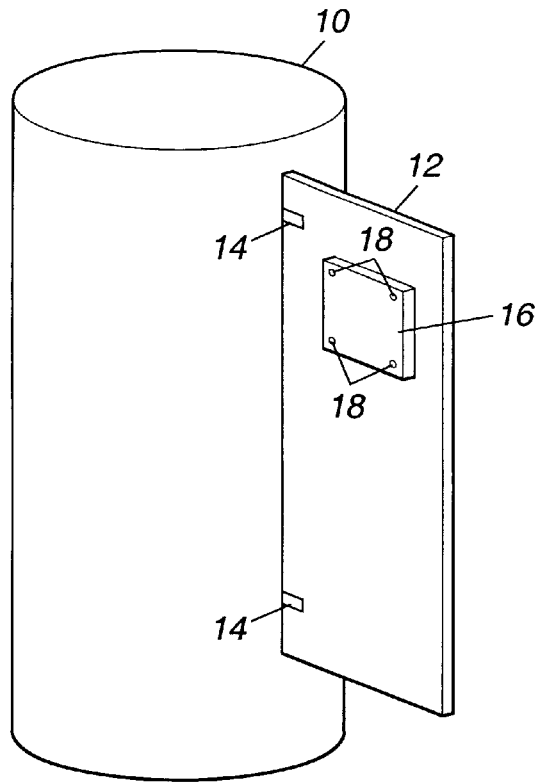
FIG. 1 is a diagrammatic view showing a portion of a spacecraft core structure and a single spacecraft module attached to the core structure.
Figure 2:
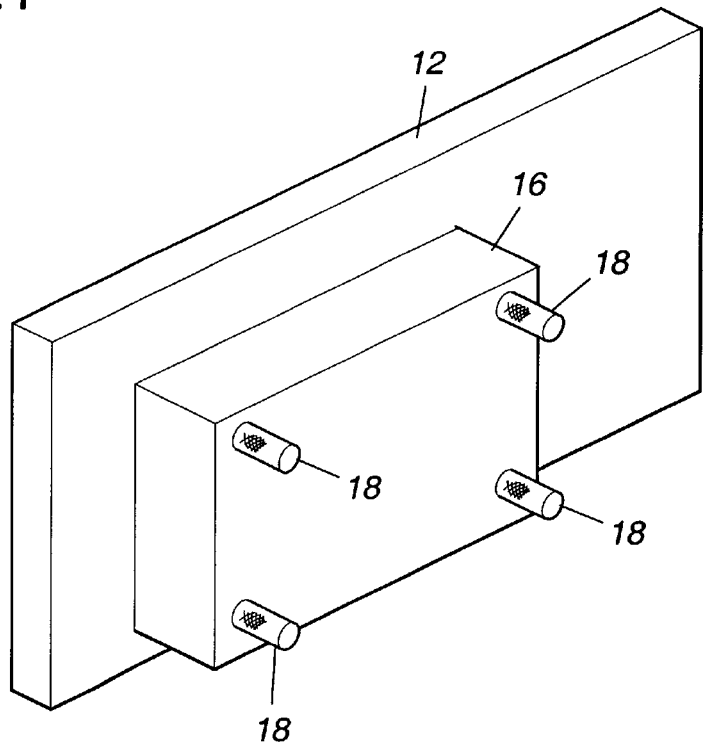
FIG. 2 is a diagrammatic view showing a portion of a spacecraft module with an attached electronics sub-module.

As shown in the drawings for purposes of illustration, the present invention pertains to construction of modular spacecraft. In the past, spacecraft modules have been housed in boxes rigidly mounted on a spacecraft core structure, and have been thermally and structurally dependent on the core structure. This dependence has led to a variety of problems, such as overly bulky construction, induced thermal stresses, and the need for heat pipes to conduct thermal energy away from the modules. Box-like modules also use launch vehicle volume very inefficiently. With increased demand for orbiting spacecraft, there is an accompanying need for more efficient techniques for constructing spacecraft from thermally and structurally independent modules.

In accordance with the present invention, a spacecraft includes a simple core structure on which multiple spacecraft modules are removably attached by convenient fasteners that require no tools for assembly and disassembly of the spacecraft. More specifically, FIG. 1 shows a spacecraft core structure in the form of a cylinder 10. Multiple spacecraft modules, one of which is shown at 12, are attached to the core structure 10 in such a way as to leave space between the modules for bulky required components such as propulsion systems and fuel tanks (not shown). One convenient modular configuration uses generally flat panels as the basis for each spacecraft module 12. Flat module panels attached in a radial configuration satisfy this requirement and have the additional advantage that the panels can provide a radiating surface that allows each module to be thermally independent. The patent application referenced above discloses a modular configuration of this general type, where the module panels are attached by mounting brackets and struts.

In the present invention, each module panel 12 is attached to the core structure by a plurality of hook-type latches 14, which require no tools to operate. In addition, sub-modules such as the one shown at 16, are attached to the module panel 12 by fasteners 18 of another type, which also do not require tools to operate. Therefore, electronics sub-modules such as the one shown at 16 can be attached to an appropriate module panel 12, and the module panels can be attached to the spacecraft core 10 in a very efficient and convenient manner. Integration of spacecraft components into a desired spacecraft configuration is rendered extremely convenient by the use of these techniques. Therefore, integration and testing of a spacecraft for a particular mission is greatly simplified.

Figure 3A:
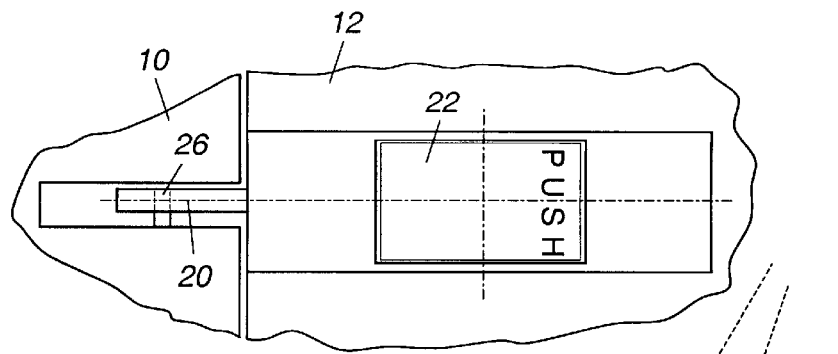
FIG. 3A is a plan view of a hook-type latch used to attach the spacecraft module to the core structure.
Figure 3B:
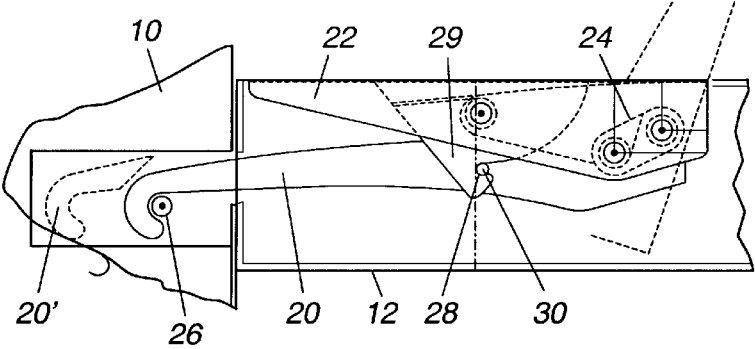
FIG. 3B is an elevational view of the hook-type latch of FIG. 3A, shown in a latched position (solid lines) and an unlatched position (broken lines)

Details of the hook-type latch 14 are shown in FIGS. 3A and 3B. The basic components of the latch 14 include a pivoted hook 20, which in the unlatched position (indicated at 20'), extends into the spacecraft core structure 10, and an operating handle 22, which is shown at 22' in its raised unlatched position. The handle 22 and the hook 20 are connected by a short link 24 such that, when the handle 22 is lowered to the latched position, the hook is drawn back into the latch mechanism and engages a pin 26 in the spacecraft module 10. As the handle 22 reaches the latched position, the handle, hook 20 and link 24 function as an over-center linkage that tends to keep the handle from springing open again. In addition, a small notch 28 in a pivoted safety latch 29 engages a retaining pin 30 on the hook 20. Opening the latch again requires pushing down on the safety latch 29 and then lifting the handle 22 to move the hook 20 away from engagement with the pin 26 in the core structure 10.

When multiple latches 14 of this type are used on each side of the spacecraft module 12, the latter is rigidly attached to the spacecraft core structure 10 and can withstand vibration and thermal stresses.

Figure 4:
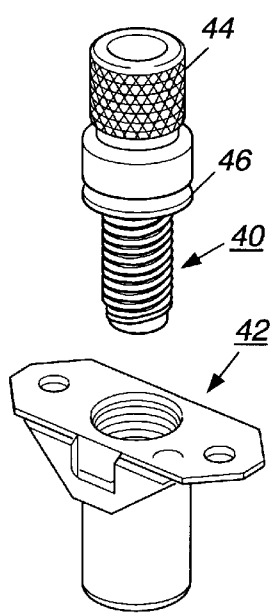
FIG. 4 is a perspective view of a fastener used to attach the electronics sub-module to the spacecraft module as shown in FIG. 2.
Figure 5A:
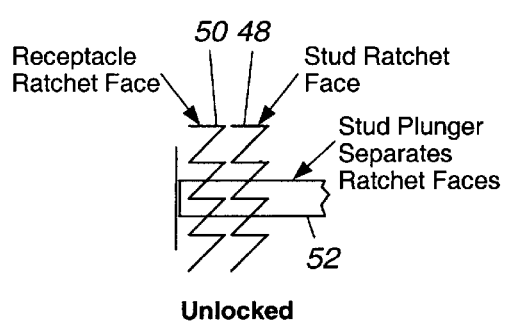
FIGS. 5A and 5B are diagrams illustrating unlocked and locked positions of a one-way ratchet mechanism used in the fastener of FIG. 4.
Figure 5B:
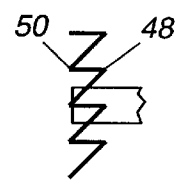

Construction is further simplified with use of the fasteners 18, shown in more detail in FIG. 4, for attachment of sub-modules 16 to a spacecraft module panel 12. Each fastener 18 includes a stud portion 40 and a receptacle portion 42. The stud 40 is externally threaded and the receptacle 42 is internally threaded to receive the stud. Although various fasteners may be employed for the purpose of the invention, the preferred embodiment uses Avilok®fasteners made by Avibank Mfg. Inc., Burbank, Calif. 91503. The receptacle 40 has a knurled operating knob 44 and a retaining washer 46 to prevent the stud from disengaging from the sub-module 16. The receptacle portion 42 is installed in the module panel 12. Although not apparent from FIG. 4, the fastener 18 includes a one-way ratchet mechanism, the principle of which is depicted in FIGS. 5A and 5B. Basically, there is a toothed ratchet wheel 48 (shown diagrammatically in FIGS. 5A and 5B) integral with the end of the stud 40 and another ratchet wheel 50 (also shown diagrammatically in FIGS. 5A and 5B) installed in the receptacle 42. The ratchet wheel 50 in the receptacle 42 is biased upwards by a spring. So long as the stud 40 is rotated clockwise to tighten the fastener, the ratchet wheel 50 in the receptacle 42 rides over the ratchet wheel 48 on the stud 40. Any attempt to rotate the stud 40 counterclockwise after it has been tightened is resisted by the one-way ratchet mechanism. It will be noted from FIG. 5B that teeth in the locked position do not permit relative movement in one direction.

The fastener 18 can only be released by unlocking the ratchet wheels 48 and 50. This is accomplished by a pin 52 accessible from the top of the fastener and extending through the stud 40 to the ratchet wheel 50 in the receptacle 42. When the pin 52 is pushed down, the ratchet wheel 50 in the receptacle 42 is moved away from the other ratchet wheel 48, allowing the stud 40 to be unscrewed. A more detailed description of how the fastener operates and is constructed can be found in U.S. Pat. No. 4,191,236 to Duran, entitled "Captive Panel Fastener Assembly."

It will be appreciated from the foregoing that the present invention represents a significant advance in the field of modular spacecraft construction. In particular, the invention provides for a modular construction that permits assembly and disassembly of spacecraft modules and sub-modules without the use of tools. It will also be appreciated that, although a specific embodiment of the invention has been described in detail by way of illustration, various modifications may be made without departing from the spirit and scope of the invention. Accordingly, the invention should not be limited except as by the appended claims.

What is claimed is:

1. A modular spacecraft construction, comprising:
   a spacecraft core structure;
   at least one spacecraft equipment module in the form of a generally flat panel;
   at least one electronic sub-module for installation on the equipment module;
   a plurality of hand-operated fasteners of a first type for attaching the spacecraft equipment module to the spacecraft core structure; and
   a plurality of hand-operated fasteners of a second type for attaching the electronic sub-module to the spacecraft equipment module;
   wherein the hand-operated fasteners of the first and second types install each module and sub-module securely, but allow for convenient assembly and disassembly without the need for tools, and wherein each fastener of the first type includes a hook-type latch with a hand-operated locking device.

2. A modular spacecraft construction as defined in claim 1, wherein the plurality of fasteners of the first type includes at least two fasteners on each face of the spacecraft equipment module.

3. A modular spacecraft construction as defined in claim 1, wherein each fastener of the second type includes a screw-type fastener having:

a threaded stud that extends through the electronic module to be attached to the module panel;

a threaded receptacle installed in the module panel to receive the threaded stud;

a one-way ratchet mechanism that prevents deliberate or inadvertent unscrewing rotation of the threaded stud; and a ratchet release mechanism to permit removal of the threaded stud.

\* \* \* \* \*